UNITED STATES PATENT OFFICE.

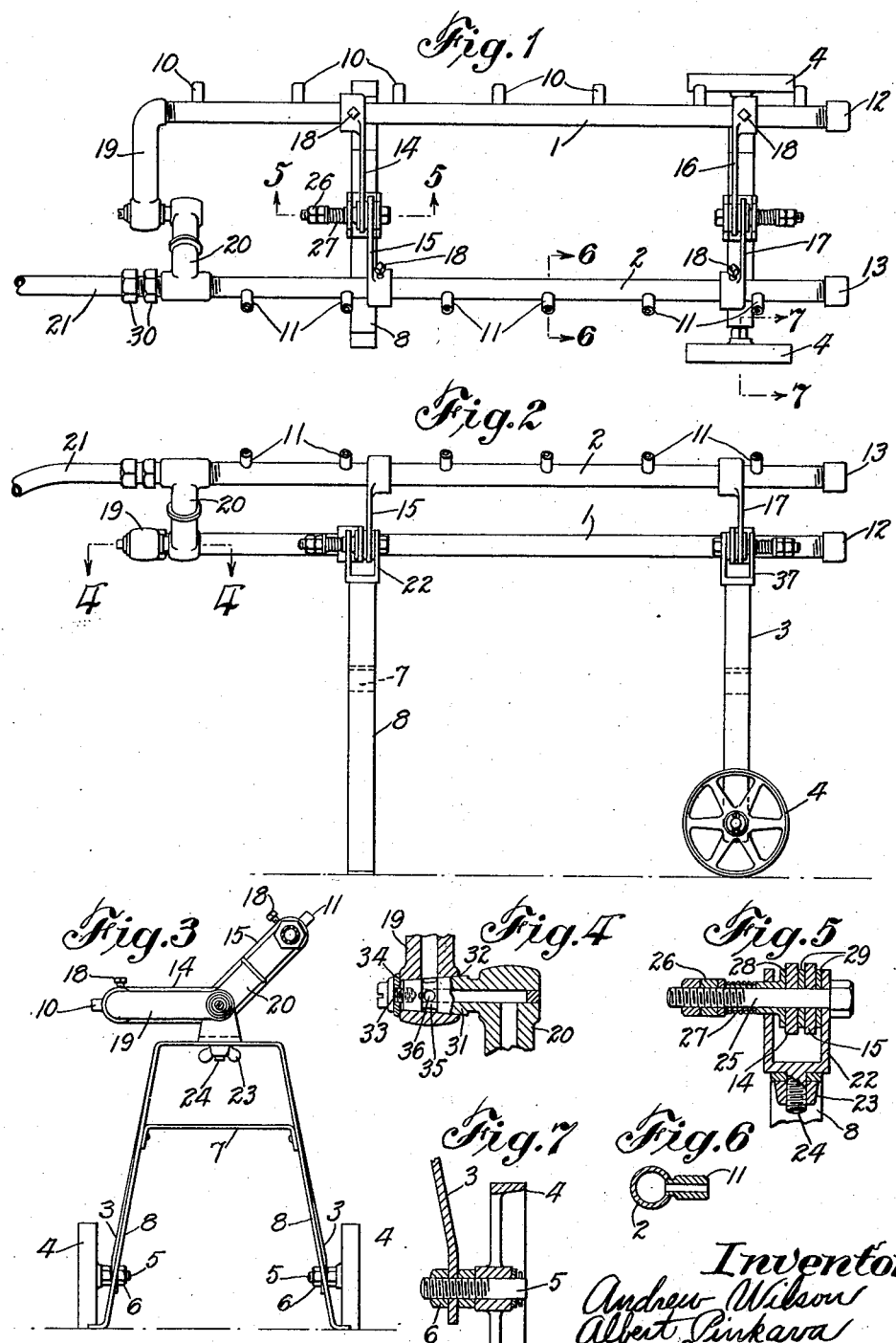

ANDREW WILSON AND ALBERT PINKAVA, OF SPRINGFIELD, NEW JERSEY.

LAWN AND GARDEN SPRINKLER.

1,191,643.          Specification of Letters Patent.      Patented July 18, 1916.

Application filed November 13, 1915. Serial No. 61,206.

*To all whom it may concern:*

Be it known that we, ANDREW WILSON and ALBERT PINKAVA, citizens of the United States, residing at Springfield, in the State of New Jersey, have invented certain new and useful Improvements in Lawn and Garden Sprinklers, of which the following is a specification, reference being had therein to the accompanying drawing.

Our invention consists in certain novel and useful improvements in lawn, plant, and garden sprinklers, and relates particularly to portable sprinklers which can be readily moved about from one point to another, either on lawns, flower beds, terraces, gardens, or other places.

The object is to increase the efficiency of a device of this character without unduly complicating its structure, or making it any more expensive to make and operate.

The invention, therefore, comprises a portable sprinkling device having parallel elongated sprinkler sections mounted adjustably with relation to each other and jointly capable of being moved about so as to extend the range of the use of the device, together with novel supporting means and adjustable feet; and also numerous details and peculiarities in the construction, arrangement and combination of the parts, substantially as will be hereinafter described and more particularly pointed out in the claims.

In the accompanying drawing illustrating our invention: Figure 1 is a top plan view of our improved portable sprinkler device; Fig. 2 is a side elevation of the same; Fig. 3 is a left hand end elevation; Fig. 4 is an enlarged detail section on the line 4, 4 of Fig. 2; Fig. 5 is a sectional detail on the line 5, 5 of Fig. 1; Fig. 6 is an enlarged detail section on the line 6, 6 of Fig. 1; Fig. 7 is a section on the line 7, 7 of Fig. 1.

Similar characters of reference designate corresponding parts throughout the different figures of the drawing.

In carrying our invention into practical effect, we provide two or more lengths of suitable piping, the length being as much as may be convenient, but preferably several feet or more, and the diameter of the piping being greater or less, as may be preferred. These pipes 1 and 2 are placed parallel to each other, and means are provided for supporting and relatively adjusting them in the manner we shall presently specify. These pipes are provided with lateral projecting nozzles, those on pipe 1 being designated 10, and those on pipe 2 being designated 11, and through these nozzles the water is ejected in small jets, sprays, or otherwise, for watering a lawn, garden or other surface, over or upon which the sprinkler may be placed.

One end of the pipe 1 is closed by a cap 12, and the adjoining end of the pipe 2 is closed by a cap 13. The other end of the pipe 1 connects by an elbow 19 with an elbow 20 which is secured to the pipe 2, and the end of the latter pipe is entered by the supply hose 21 which is coupled thereto in any desired manner and held fast by means of nuts 30 or other means. The details of the means for connecting the elbows 19 and 20 to each other and permitting water to course through them from one to the other so as to fill the pipes 1 and 2 are clearly shown in the sectional view in Fig. 4. Referring to said figure it will be seen that the elbow 20 has a passage therein, one portion of which is at right angles to the remainder, and the end of said elbow 20 is formed with a right angled conical integral extension 31 which enters a conical opening 32 in the end of the elbow 19, and is held tightly and adjustably therein by means of a screw 33 and washer 34. The conical extension 31 is provided with an encircling groove 35 and a perforation 36. Water emerges from the passage within the pipe 20 through the perforation 36 into the groove 35 and simultaneously into the bore of the elbow 19. Thus we provide a movable connection or watertight joint between the elbows 19 and 20 on which the pipes 1 and 2 may be adjusted toward and away from each other. These pipes 1 and 2 are also supported adjustably by means at two or more points, consisting in one instance of a pair of levers 14 and 15, the lever 14 being secured fast to the pipe 1 and the lever 15 being secured to the pipe 2, and in another instance by the levers 16 and 17, the former being secured to the pipe 1 and the latter to the pipe 2, the securing of all these levers to the respective pipes being made preferably by means of set-screws 18 passing through collars on the ends of the arms and engaging the pipes, although substitute attaching means may be used if desired. These levers 14 and 15 have their inner ends pivoted together, while likewise the levers 16 and 17 have their inner ends pivoted together.

The mode of pivotally uniting the levers 14 and 15, as also the levers 16 and 17, is shown in the sectional view in Fig. 5. We employ a bifurcated support 22 whose prongs are perforated and carry a bolt 25 on which is a lock nut and washer 26, an encircling spring 27 and a sleeve 28, the spring 27 being tensioned between the sleeve 28 and the lock nut and washer, and the sleeve 28 being supported in one of the prongs of the bifurcated support 22. Between the sleeve 28 and the opposite prong of the bifurcated support are the inner ends of the levers 14 and 15 suitably spaced apart by washers 29. The spring 27 obviously holds the two levers close to each other and firmly within the bifurcated support and enables these arms to have a frictional pressure on each other which will keep them in any desired position to which they may be adjusted. The support 22 is provided on its underside with a screw 24, which screws into the horizontal top part of a standard 8 having a pair of legs resting on the ground or other surface, as shown in Figs. 1 and 2 and 3, said screw 24 being provided with a thumb nut 23, which, with a washer holds the bifurcated support 22 firmly upon the supporting legs. By a similar construction and arrangement of nuts, spring, etc., in connection with a similar bifurcated support 37, the inner ends of the levers 16 and 17 are movably pivoted together and carried upon the top of a forked frame 3 similar to the forked frame 8, except that it is provided with wheels 4 whose shafts 5 are supported in the lower ends of the legs 3 and firmly held by means of nuts applied to the screw-threaded ends of the shafts 5 which pass through the legs 3. The legs 3, as well as the legs 8, are braced by means of a strut 7 illustrated in Fig. 3. It will be obvious that the two pairs of legs may be placed at different angles when the ground is uneven, or on a terrace, and that the pipes may be adjusted nearer to each other or farther apart, and so placed that the showers of water from the nozzles 10 and 11 will fall at different angles. The pipes may be so adjusted as to lie one above the other, both being on the same side so that the water from both is thrown in the same direction, which is a preferable way to adjust the device when sprinkling along the edge of a drive or walk. It will be observed that the short shafts 5 for the wheels 4 are an advantage, since a long shaft passing through both the legs 3 would be an obstacle in the way of moving the device about as it would strike plants and flowers. With the short shafts 5 the space between legs 3 is left open. Many changes may be made in the combination and arrangement of the parts.

Having thus described our invention, what we claim as new and desire to secure by Letters Patent, is:

1. A lawn sprinkler, consisting in the combination with parallel pipes having nozzles thereon, of movable water-tight joint mechanism for connecting the pipes, and means for supporting the pipes consisting of interpivoted levers provided with means for causing them to frictionally press toward each other and be retained in any desired position, together with supporting legs for said levers.

2. In a lawn sprinkler, the combination of parallel pipes having nozzles thereon, a movable joint connecting said pipes and allowing the passage of water from one to the other, one or more pairs of interpivoted levers secured to the pipes, spring-provided pivots on which the levers are mounted so as to frictionally press toward each other and be retained in one position, and means for supporting said pivots.

3. In a lawn sprinkler, the combination of parallel pipes having nozzles thereon, a movable joint connecting said pipes and allowing the passage of water from one to the other, one or more pairs of interpivoted levers secured to the pipes, spring-provided pivots on which the levers are mounted so as to frictionally press toward each other and be retained in one position, and frames having pairs of feet for supporting said levers and their pivoting mechanism.

4. In a sprinkling device, the combination of parallel pipes having nozzles, a pair of levers secured to the pipes, means for pivoting said levers together, said means provided with spring devices for holding the levers pressed toward each other, legs for supporting said pivotal means, another pair of levers secured to the pipes, means for pivoting said levers together, said means having spring devices for holding the levers pressed toward each other, a frame for carrying said pivoting means, said frame being provided with rollers.

5. In a sprinkler of the class described, the combination of pipes provided with nozzles, a pair of levers attached to said pipes near one end and pivoted to each other, another pair of levers attached to said pipes near the other end and pivoted to each other, a flexible water-tight joint uniting the pipes at one point and movable in correspondence with the adjustment of the pairs of levers so that the pipes may be placed at various angles and closer to or farther away from each other, and suitable supporting means for the levers, said means being adjustable at different supporting angles.

6. In a sprinkling device, the combination of parallel pipes having nozzles thereon, a pair of levers secured to the pipes, spring-provided pivots on which the levers are mounted so as to frictionally press toward each other and be retained in position, a flexible joint for uniting the pipes, and means for supporting the levers and their pivotal mechanism.

In testimony whereof we affix our signatures.

ANDREW WILSON.
ALBERT PINKAVA.

Copies of this patent may be obtained for five cents each, by addressing the "Commissioner of Patents, Washington, D. C."